United States Patent [19]

Chaudhary

[11] 4,341,805
[45] Jul. 27, 1982

[54] HIGH DIETARY FIBER PRODUCT

[75] Inventor: Vinod K. Chaudhary, Manhattan, Kans.

[73] Assignee: Miller Brewing Company, Milwaukee, Wis.

[21] Appl. No.: 215,291

[22] Filed: Dec. 11, 1980

Related U.S. Application Data

[63] Continuation of Ser. No. 73,953, Sep. 10, 1979, abandoned.

[51] Int. Cl.$^3$ .................. A23L 1/185; C12C 7/00; A21D 13/02
[52] U.S. Cl. .................................. 426/481; 426/29; 426/618
[58] Field of Search .................. 426/16, 29, 31, 481, 426/618

[56] References Cited

U.S. PATENT DOCUMENTS 3,212,902 10/1965 Bavisotto .............................. 426/31

3,615,655 10/1971 Freeman et al. .............. 426/481 X

OTHER PUBLICATIONS

DeClerck, J., A Textbook of Brewing, vol. one, Chapman & Hall, Ltd., London, 1957, (pp. 299-301).
Dietary Fiber, Food Technology, Jan. 1979, (pp. 35-39).

*Primary Examiner*—David M. Naff
*Attorney, Agent, or Firm*—Quarles & Brady

[57] ABSTRACT

A product for human consumption containing protein and having a high dietary fiber content and a low phytic acid content is produced by drying brewer's spent grain, milling the dried brewer's spent grain to obtain a ground product having particle sizes ranging from about 600 microns down to about 50 microns and isolating the ground particles having a particle size of at least about 120 microns which constitute the product and contain about 18% to 22% protein and about 65% to 75% dietary fiber.

2 Claims, No Drawings

HIGH DIETARY FIBER PRODUCT

This is continuation of application Ser. No. 73,953, filed Sept. 10, 1979, now abandoned.

The present invention relates generally to a method of treating brewer's spent grain, a by-product of the brewing industry. More particularly, it relates to a method of treating brewer's spent grain which is presently used for animal feed so that it can be used for human consumption. In the method of the invention the brewer's spent grain is classified into marketable fractions having either a high protein content or a high dietary fiber content.

BACKGROUND OF THE INVENTION

In the normal process of making a commercial beer, barley malt is mixed with water to form a mash. The enzymes present in the malt are then allowed to break down the barley protein. Next, adjuncts such as cooked corn or rice, are added to the mash to provide additional starch. The enzymatic conversion of the starch to sugar is then permitted to take place. After the starch conversion is more or less complete, the aqueous extract or wort is separated by filtration from the spent solids, which are commonly known as "brewer's spent grain." The hops are added during the boiling of the wort. The hops are removed and the hot wort cooled and aerated. The cooled wort is then inoculated with yeast and allowed to ferment to completion. When the yeast has settled, the immature beer is pumped into refrigerated storage tanks where it is allowed to age. When the aging is complete, the beer is clarified, carbonated under pressure, packaged and pasteurized.

The brewer's spent grain contains all the solids which are separated from the wort by filtration; it includes what is left of the barley malt and the adjuncts. Substantial quantities of brewer's spent grain are produced in the commercial production of beer. Normally, for each barrel of beer at least 8 to 12 pounds of spent grain solids are produced. The breweries usually dispose of the spent grain by selling it for cattle feed.

The brewer's spent grain, which resembles ground grain normally contains, on a bone dry basis, from 28% to 30% protein and from 50% to 55% dietary fiber. It is a good, inexpensive cattle feed. However, as cattle feed, it must compete with other even less expensive agricultural by-products, surplus grain and grazing.

SUMMARY OF THE PRESENT INVENTION

We have now discovered a method of treating brewer's spent grain to convert it into food products that can be used for human consumption and to thereby increase its value. In our method, the brewer's spent grain, which normally contains about 29% protein and about 53% dietary fiber, is separated into several marketable fractions. The fractions are of commercial value as either a source of protein for human consumption or as a source of dietary fiber for the human diet.

In our method, the brewer's spent grain is mechanically dewatered and the partially dewatered spent grain is dried to reduce the residual moisture content to less than about 12% by weight. Once thus dried, the spent grain is milled into particles ranging from about 600 microns down to below 50 microns in size and separated or classified into two or more fractions. The finest of the fractions contains the highest percentage of protein and the coarsest fraction contains the highest percentage of dietary fiber. The fractions thus obtained are suitable for use in human food.

Dietary fiber is normally defined as the skeletal components of the plant cell resistant to digestion by enzymes in the human digestive tract. Dietary fiber includes hemicelluloses, pectin substances, gums and other carbohydrates as well as lignin and cellulose.

Dietary fiber is in demand because of the benefits which are said to accompany its consumption. The physiological claims for dietary fiber include its use for relieving constipation by increasing the water content of the feces, for treating or preventing diverticular disease and for possibly reducing serum cholesterol. Therefore, there is an interest in supplementing processed food products for human consumption with dietary fiber. Most of the dietary fiber which is added to such food products today comes from white wheat bran. Other sources include oats, corn bran, soy bran, rice bran and finely divided cellulose, including wood cellulose.

The high dietary fiber fractions obtained from brewer's spent grain by the method of the present invention can be substituted for white wheat bran in baked products, extruded products and for other uses. Furthermore, they possess the advantages of having both a higher protein and a higher dietary fiber content than white wheat bran. The highest dietary fiber fraction obtained by the practice of the present invention contains about 70% dietary fiber and about 20% protein. In contrast, white wheat bran normally contains only about 36% dietary fiber and about 17% protein.

The highest protein containing fraction obtained from the brewer's spent grain contains from 39% to 42% protein and it is suitable for use as a protein supplement for products for human consumption. It is also a fairly good source of fiber as it normally contains about 30% to 40% dietary fiber.

DETAILED DESCRIPTION OF PREFERRED EMBODIMENT

Figure 1:
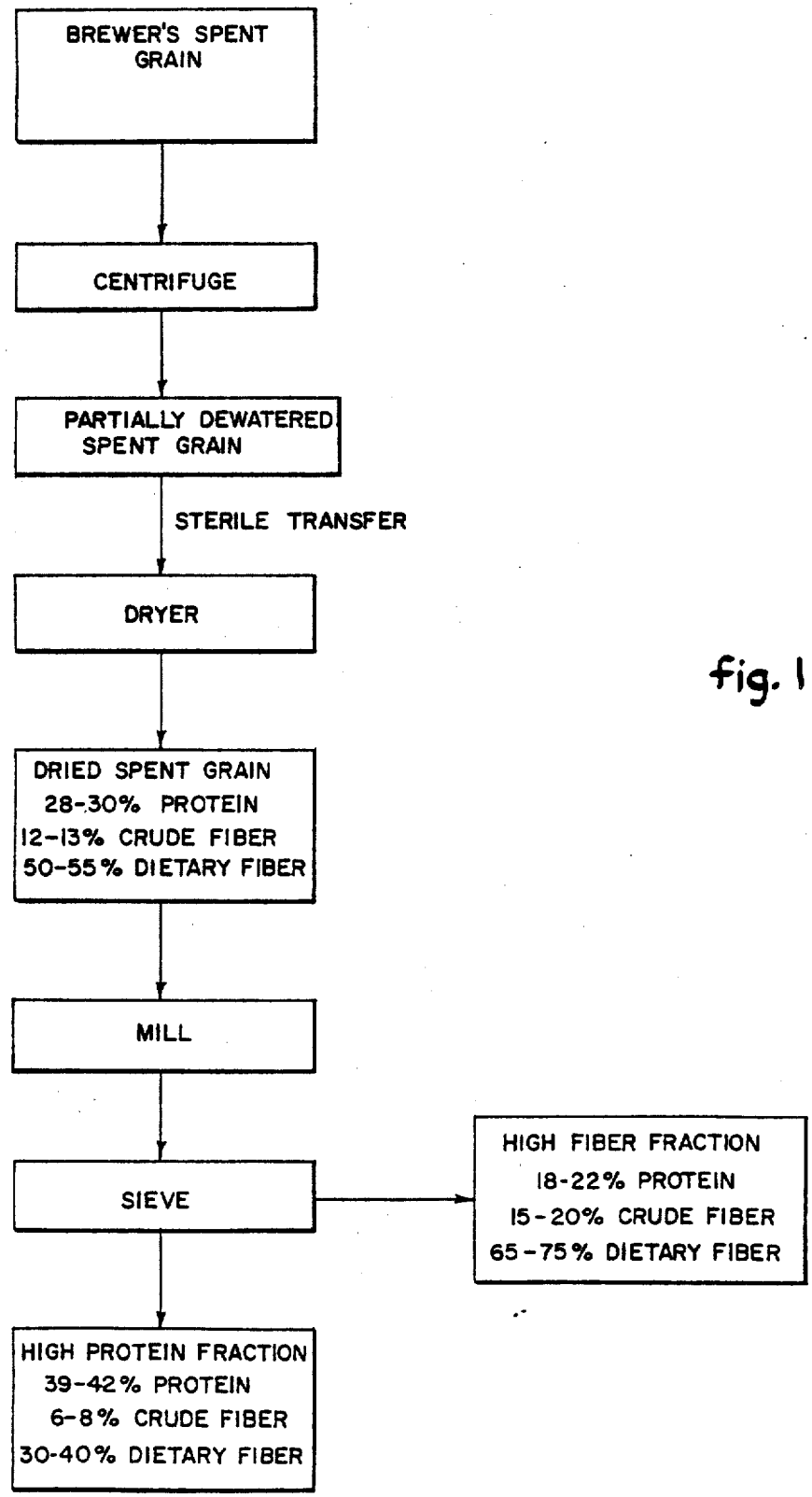
FIG. 1 is a flow chart showing the steps involved in a preferred embodiment of the method of the present invention.

The brewer's spent grain as it is taken from the wort filter contains a significant quantity of liquid wort which can be physically separated from the spent grain preferably by use of a centrifuge operated under sanitary conditions. The partially dewatered spent grain is then transferred from the centrifuge to a dryer by a series of screw conveyors. The transfer is preferably accomplished under sanitary conditions by blanketing the conveyors with steam. The spent grain is dried to reduce the moisture content to less than about 12%. The dried spent grain thus obtained contains about 28% to 30% protein and about 50% to 55% dietary fiber. The dried spent grain is then ground in a mill. Preferably the ground grain is comprised of particles which range in size from about 600 microns down to below 50 microns in size. From the mill, the ground spent grain is transferred to a continuously operating reed-hung sifter such as that used in flour mills. The sifter is provided with silk cloth sieves having openings of about 100 to about 200 microns. The fraction passing through the smallest mesh sieve has a protein concentration of about 39% to 42%. The coarsest fraction which is retained on the sieves is made up primarily of particles which are larger than about 200 microns. It contains about 18% to 22% protein and 65% to 75% dietary fiber.

The high fiber fractions have been used to prepare extruded food products, such as raisin bran, by including 25% of the fiber fraction by weight of the dried ingredients in the recipe. They have also been incorporated in baked products, such as bread where they were added in an amount equivalent to 15% by weight of the flour. The resulting products were evaluated and found to be as acceptable as similar products made with white wheat bran.

The high protein fractions have been used in both snack and baked products with success. Corn curls were prepared using 20% by weight of the corn meal of the high protein fraction. They were also incorporated into recipes for cookies in an amount equivalent to 25% to 33% by weight of the flour and in recipes for donuts and cupcakes in the amount equivalent to 10% by weight of the flour.

The high fiber fractions obtained from brewer's spent grain possess several advantages over the white wheat bran which is most widely used. White wheat bran does not keep too well because of its high moisture content whereas the high fiber fraction obtained by the practice of the present invention has a very low moisture content and a good storage life. Furthermore, it contains more protein, more dietary fiber, more celullose, more hemicellulose and more lignin than white wheat bran. It also contains less phytic acid. A high phytic acid content is undesirable as it forms complexes with essential minerals making them nutritionally unavailable in the diet.

A comparison of the crude fiber, dietary fiber, protein, cellulose, hemicellulose, lignin, phytic acid and fat content of a high fiber fraction of the present invention and those of white wheat bran and other high fiber sources currently available are shown in Table 1.

TABLE I

| ANALYSIS OF FIBER FOOD PRODUCTS (% DRY BASIS) | | | | | | | |
|---|---|---|---|---|---|---|---|
| | Protein | Dietary Fiber | Crude Fiber | Crude Fat | Cellulose | Hemi-Cellulose | Lignin | Phytic Acid |
| WHOLE SPENT GRAIN | 29.9 | 53.5 | 12.5 | 7.2 | 16.5 | 33.5 | 3.4 | 0.048 |
| HIGH FIBER FRACTION OF SPENT GRAIN | 21.5 | 67.0 | 16.5 | 5.8 | 20.0 | 41.5 | 5.3 | 0.060 |
| WHITE WHEAT BRAN | 17.3 | 36.0 | 6.5 | 3.3 | 6.5 | 27.3 | 1.9 | 1.50 |
| CORN BRAN | 7.9 | 79.0 | 14.1 | 0.8 | 17.2 | 60.5 | 1.1 | 0.50 |
| SOY BEAN | 17.6 | 63.9 | 31.1 | 0.7 | 39.1 | 20.6 | 3.9 | 0.10 |
| RICE BRAN | 21.7 | 28.3 | 8.7 | 2.5 | 6.5 | 18.0 | 3.5 | 6.90 |

The method of the invention is further illustrated by the example which follows.

EXAMPLE

Brewer's spent grain was taken from a lauter tub and partially dewatered by means of a grain press. The damp, spent grain was then transferred by a screw conveyor to a commercial rotary dryer where it was dried to a moisture content of about 6 to 7%.

The dried spent grain was then transferred to a mill (Pulverizer Model 10, Mikro ACM Pulverizing Machine Company, Chatham Road, Summit, N.J.). The mill had a capacity of 300 to 400 lbs. per hour. The grain was ground until it had a particle size ranging from about 600 microns down to below 50 microns. The particle size distribution obtained from the milling process is shown in Table 2.

The ground spent grain was then transferred to a continuous reed-hung sifter (Great Western, Leavenworth, Kansas). The sifter was a model 2X14 (two boxes, fourteen screens) with a power rating of ¾ HP and a capacity for wheat flour of 2500-3000 lbs. per hour. The sifter was modified to use two screens. Both screens were silk cloth. One screen had openings of 130 microns (10xx) and the other had openings of 120 microns (11xx). The thus modified sifter had a capacity for the ground spent grain of 400-500 lbs. per hour. The frequency used was 180 r.p.m.'s with a 4" throw. The finely ground fractions which passed through the screens were collected and combined to form a high protein fraction and the two coarse fractions that were retained upon the screens were combined to form a high-fiber fraction.

A particle size analysis of the milled product was done by means of a RO-TAP sifter. The particle size distribution and the crude fiber, dietary fiber and protein concentrations of each fraction are given in Table II. All the percentages were based by weight on a bone dry basis.

The dried spent grain which was introduced in the mill had a protein content of about 30% by weight, and a dietary fiber of 53% by weight. The high fiber fractions which were obtained constituted 57% of the total weight of the dried spent grain and contained 21% protein, and 67% dietary fiber. The high protein fraction was 43% of the total of the dried spent grain and it contained 41% protein, and 35% dietary fiber. If desired a high fiber fraction without grain hulls can be obtained by passing the high fiber fraction through additional sieves.

TABLE II

PARTICLE SIZE DISTRIBUTION OF MILLED SPENT GRAIN

| Tyler Sieve No. | Microns | % on Sieve | % Protein | % Dietary Fiber | % Crude Fiber |
|---|---|---|---|---|---|
| 35 | 420 | 9.0 | 9.0 | 85.0 | 31.3 |
| 48 | 297 | 13.0 | 14.0 | 74.5 | 24.9 |
| 65 | 210 | 18.0 | 24.7 | 57.2 | 13.5 |
| 100 | 149 | 29.0 | 34.2 | 46.0 | 7.9 |
| 150 | 105 | 29.0 | 41.5 | 38.0 | 5.5 |
| Pan | — | 2.0 | 45.9 | 29.3 | 4.3 |

It will be apparent to those skilled in the art that the foregoing description has been for purposes of illustration and that the present invention is not so limited. For example, although in the example the grain was classified using silk cloth sieves other means could be used such as an air classifier. It also will be appreciated that the damp grain can be dewatered and dried to the desired moisture content by other means than those described. Therefore, it is intended that the foregoing and other changes and modifications be considered to be within the scope of the present invention which is to be limited only by the claims which follow.

I claim:

1. A method of preparing a product for human consumption containing protein and having a high dietary fiber content and a low phytic acid content, which method consists essentially of drying brewer's spent grain to less than about 12% moisture by weight, milling the dried brewer's spent grain to obtain a ground product having particle sizes ranging from about 600 microns down to about 50 microns and isolating the ground particles having a particle size of at least about 120 microns which constitute said product and contain about 18% to 22% protein and about 65% to 75% dietary fiber.

2. The product suitable for human consumption which contains protein and has a high dietary fiber content and a low phytic acid content prepared by the method of claim 1.

* * * * *

UNITED STATES PATENT AND TRADEMARK OFFICE
CERTIFICATE OF CORRECTION

PATENT NO. : 4,341,805
DATED : July 27, 1982
INVENTOR(S) : Vinod K. Chaudhary

It is certified that error appears in the above—identified patent and that said Letters Patent is hereby corrected as shown below:

The attached sheet of drawing containing Figure 1, should be added to the Letters patent.

Signed and Sealed this

Nineteenth Day of October 1982

[SEAL]

Attest:

GERALD J. MOSSINGHOFF

*Attesting Officer*  *Commissioner of Patents and Trademarks*